(12) United States Patent
Danthony

(10) Patent No.: US 7,466,483 B2
(45) Date of Patent: Dec. 16, 2008

(54) MASKING DEVICE FOR A CINEMA SCREEN

(76) Inventor: Guy Danthony, 156, chemin du Pont de l'Ane, F-01600 Parcieux (FR)

( * ) Notice: Subject to any disclaimer, the term of this patent is extended or adjusted under 35 U.S.C. 154(b) by 0 days.

(21) Appl. No.: 10/557,781

(22) PCT Filed: May 19, 2004

(86) PCT No.: PCT/FR2004/001248

§ 371 (c)(1), (2), (4) Date: Feb. 8, 2007

(87) PCT Pub. No.: WO2004/107039

PCT Pub. Date: Dec. 9, 2004

(65) Prior Publication Data

US 2007/0171522 A1    Jul. 26, 2007

(30) Foreign Application Priority Data

May 23, 2003  (FR)  .................................. 03 06277
Jun. 16, 2003  (FR)  .................................. 03 07216

(51) Int. Cl.
*G03B 21/56* (2006.01)
(52) U.S. Cl. ...................................... 359/450; 359/461
(58) Field of Classification Search ................. 359/450, 359/461; 160/372–373, 309, 240
See application file for complete search history.

(56) References Cited

U.S. PATENT DOCUMENTS

| 1,857,368 | A | * | 5/1932 | Flynn et al. .................. 359/450 |
| 1,857,673 | A | | 5/1932 | Vallen et al. |
| 1,882,828 | A | * | 10/1932 | Hall et al. .................... 359/450 |
| 5,121,977 | A | * | 6/1992 | Weisgerber .................. 359/450 |
| 5,343,257 | A | | 8/1994 | Kohno et al. |
| 5,523,880 | A | | 6/1996 | Pidgeon et al. |
| 6,848,491 | B2 | * | 2/2005 | Gambarelli et al. ......... 160/122 |

OTHER PUBLICATIONS

International Search Report; PCT/FR2004/001248; Dec. 16, 2004.
Database WPI; Section PQ, Week 198249; Derwent Publications Ltd., London, GB; AN 1982-A8333J; XP002305572 & SU 900 842 A (SP K B MIN Vysshego Srednego S), Jan. 30, 1982; abstract; figure 1.

* cited by examiner

*Primary Examiner*—Christopher Mahoney
(74) *Attorney, Agent, or Firm*—Cantor Colburn LLP

(57) ABSTRACT

The invention relates to a masking device (1), for a cinema screen, comprising at least two masks arranged in front of said screen (2) and arranged in pairs, symmetrically along at least two sides thereof, left and right, and/or top and bottom, each mask comprising a rolling axle (7) and a cloth (8) rolled around said axle. Each cloth has a rolled edge (10) and a free edge (9), characterised in that at least the lower mask (6) and/or the pair of left (18) and right (19) masks have a tensioner (12), for holding the free end of the cloth thereof, the length of the tensioner being greater than the length of the cloth and means for controlling the position of the tensioner in a plane essentially parallel to the plane of the screen (2) and in a direction perpendicular to the direction of unrolling of the cloth such that each cloth (8) can be unrolled from the axle (7) thereof in the direction of the centre of the screen (2) to adjust the masking surface of said mask.

14 Claims, 6 Drawing Sheets

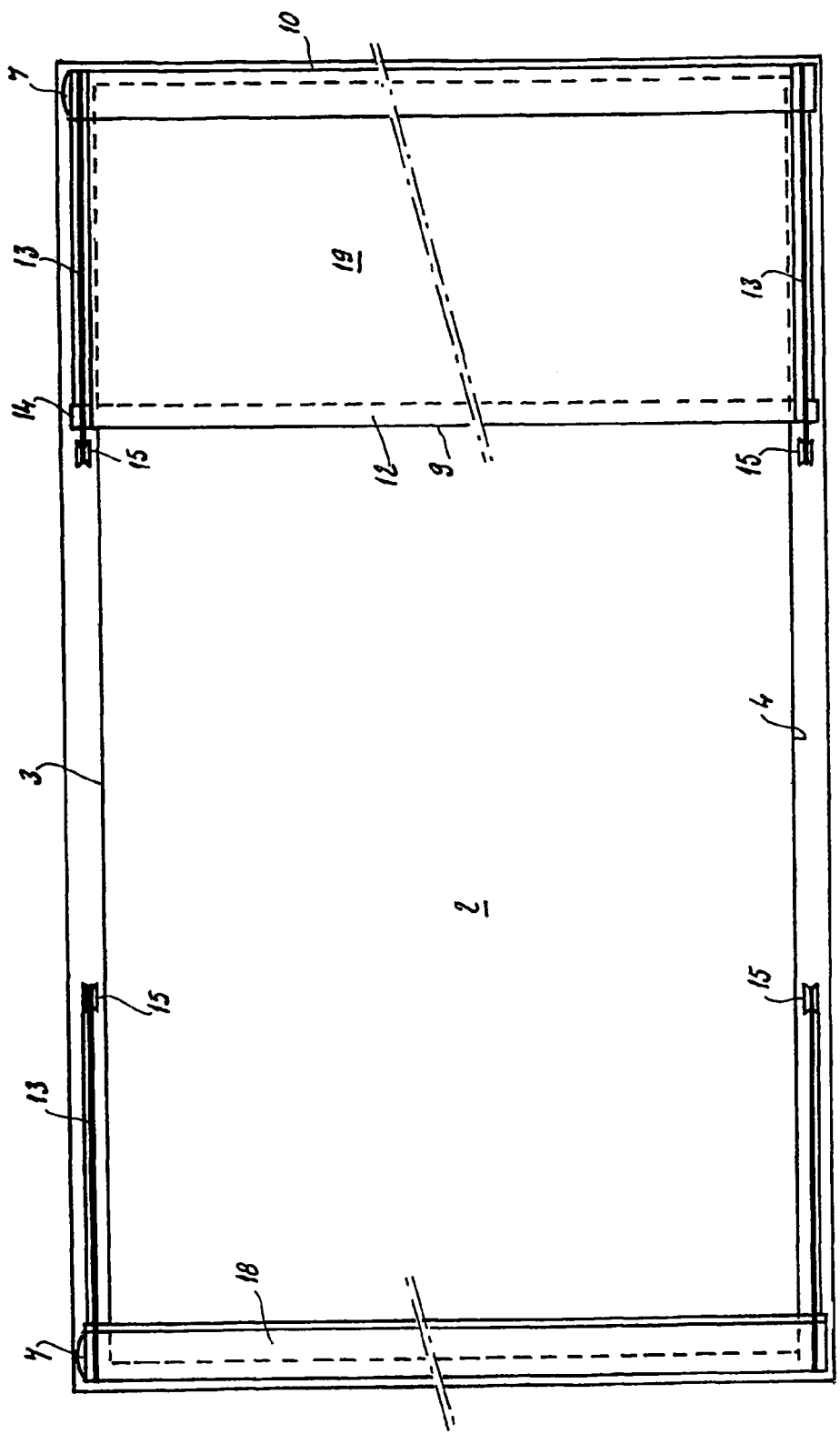

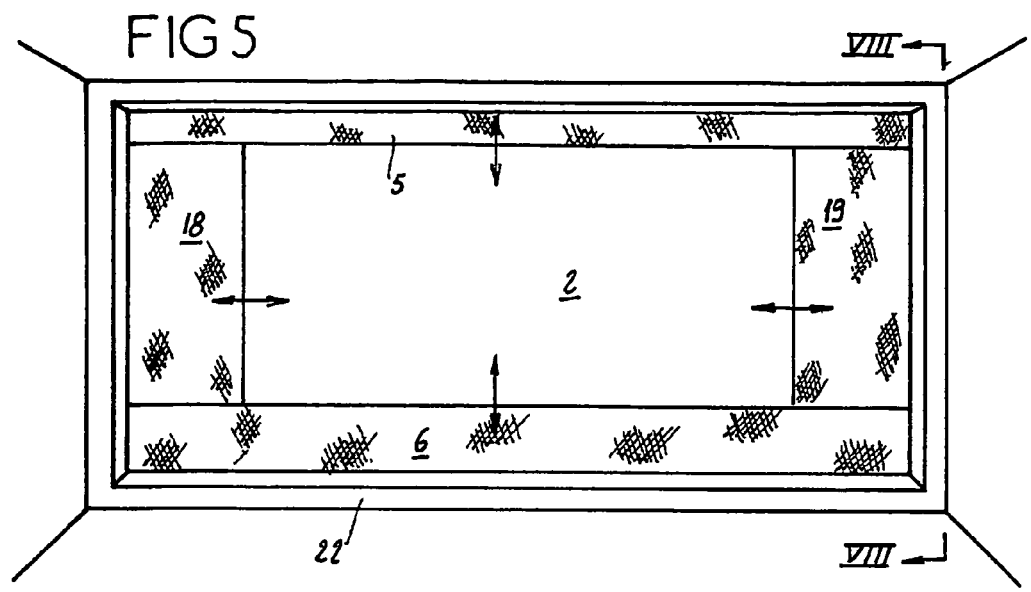
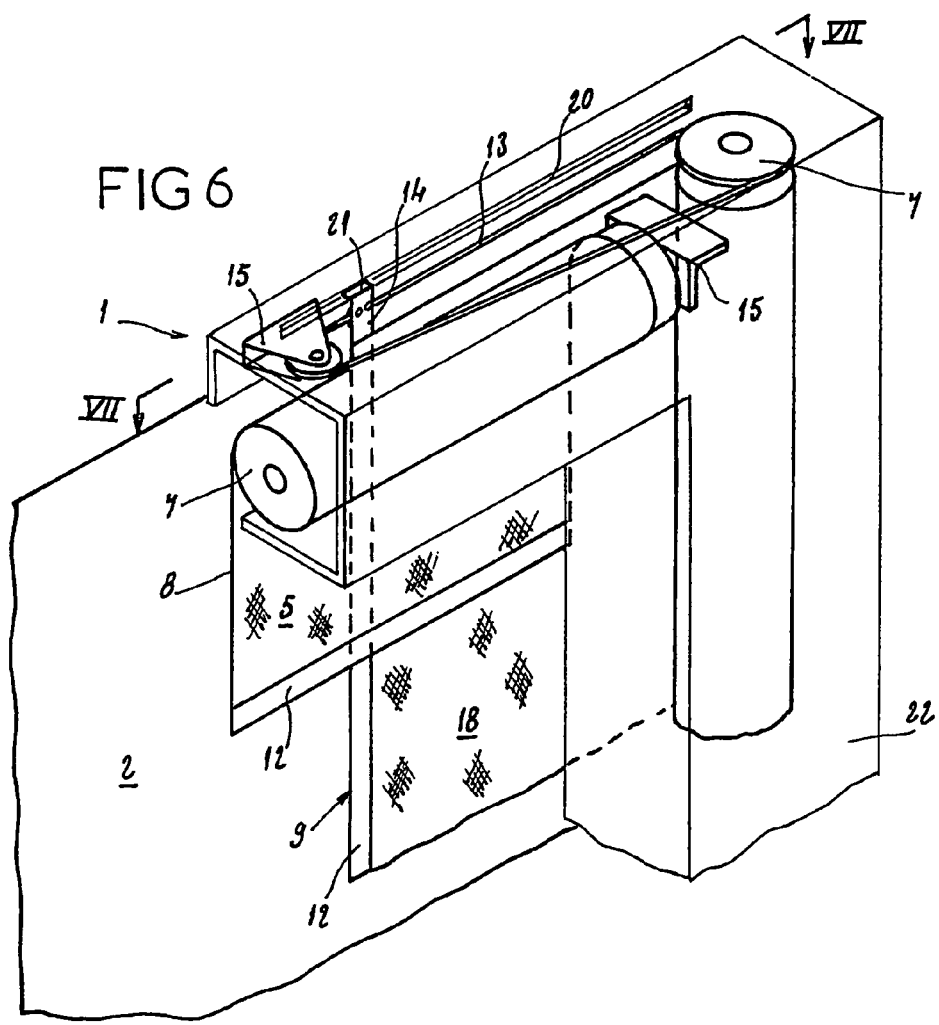

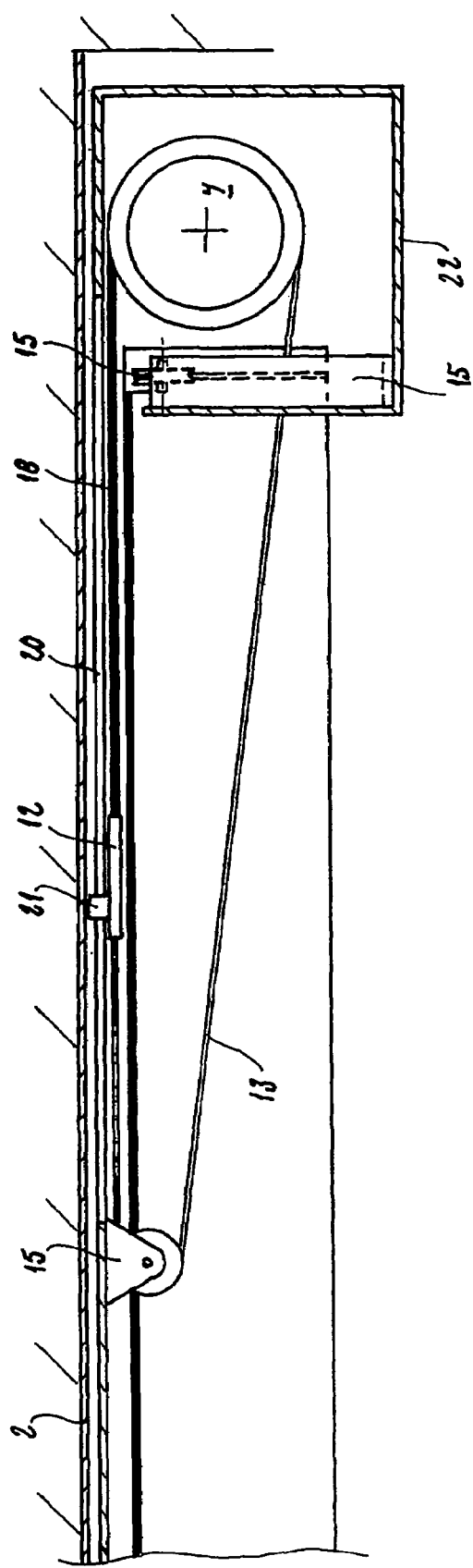

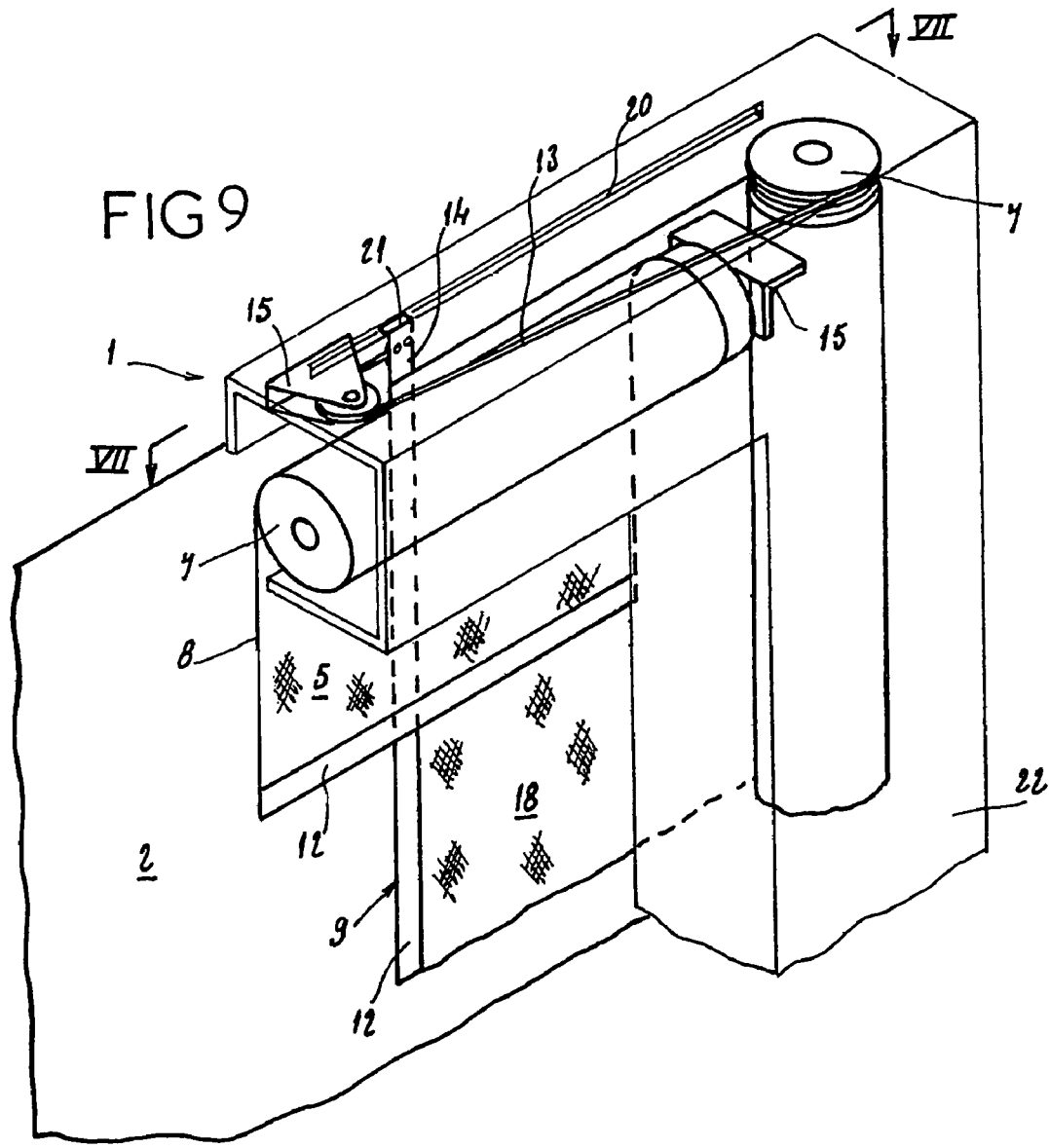

MASKING DEVICE FOR A CINEMA SCREEN

BACKGROUND OF THE INVENTION

The present invention relates to a masking device for a cinema screen.

DESCRIPTION OF THE PRIOR ART

During a videoprojection show, particularly in the home, an important criterion of the quality of projection is the contrast ratio of the projected image. This contrast ratio is obtained largely thanks to the greater or lesser quality of the videoprojector. Nevertheless, the contrast of the image perceived by the viewers also depends on the environment around the screen.

Thus, when an image is projected onto a white screen, and does not cover the whole of this screen, the remaining margins appear gray (dark) during the projection, which reduces the quality of the image contrast perceived by the viewers.

For this reason, black masks are sold which cover the upper and lower margins of a screen, and where necessary the left and right margins, when the image format does not cover the whole of the screen area.

The known devices are used to mask the top, bottom, left and/or right margins of a 4/3 format screen, when the projected image is in 16/9 format.

Nevertheless, other videoprojection formats exist, for which the top and bottom margins are not identical, that is to say that the horizontal midline of the projected image is situated above or below the horizontal midline of the screen.

In addition, in the known devices that propose left and right side masks, the latter take the form of cloths that are unrolled from the top of the screen when it is desired to reduce the available screen width. With such devices, it is impossible to obtain a precise variation of the screen width masked, the latter then specifically corresponding to the width of cloth of each of the side masks.

Finally, the existing devices are of complex structure, requiring many electric motors, and are extremely costly for the manufacturer to produce, and for the final customer to purchase.

SUMMARY OR THE INVENTION

The object of the present invention is therefore to provide a cinema screen masking device of a structure such that it resolves the disadvantages associated with the operating limitation of the existing devices, while making it possible to mask as required the side and/or top and bottom margins of the screen, so that the relative positioning of the masks suits any projected image format.

The object of the invention is achieved with a masking device for cinema screens comprising at least two masks disposed in front of said screen, and placed in pairs symmetrically along at least two sides, left and right and/or top and bottom, of the latter, each mask comprising a rolling shaft and a cloth rolled up around said shaft, each rolling shaft protruding either side of the cloth and each cloth comprising a rolled edge and a free edge.

More particularly, the invention is characterized in that the lower mask and/or the pair of left and right masks comprise(s)
(i) a tensioner for holding the free edge of the cloth of each mask, the length of the tensioner being greater than the length of the cloth, and
(ii) means of controlling the positioning of the tensioner in a plane substantially parallel to the plane of the screen and in a direction perpendicular to the unrolling direction of the cloth, said means consisting, on the one hand, of ropes each attached to one end of the tensioner protruding from the cloth and each connecting, in a direction substantially parallel to the unrolling direction of the cloth, said ends to the rolling shaft by means of angle transmission pulleys each placed facing a corresponding protruding end and at a distance from the rolling shaft, and, on the other hand, of means of rotating the rolling shaft, so that each cloth can be unrolled from its shaft toward the center of the screen to adapt the masking area of said mask.

The device according to the invention, due to its simple structure, allows a particularly low production and implementation cost, and is also adaptable to all types of flat screens, from small "home cinema" screens to the giant screens of auditoria. This device can be installed on new screens, or adapted to screens already in place.

In addition and above all, it reutilizes a virtually identical mechanism on all the masks of the device, so that the total production cost is extremely low. Thus, the device according to the invention may comprise only top and bottom masks, or left and right masks, or a combination of these two pairs of masks depending on the type of screen used and depending on the projection formats that the user wishes to be able to play back. In all cases, the user has a device that is simple and cheap to produce, easy to maintain and, if it combines both types of mask pairs, then forms a universal system for converting the screen area to the projected image format.

In addition, the maintenance and where necessary replacement of certain elements forming the masks is easy and economical since these constituent elements are few in number and extremely easy to access.

Advantageously, the device according to the invention comprises a pair of masks, upper and lower, the upper mask comprising actuation means allowing the rotation of its rolling shaft and therefore the adjustment of the masking area of the corresponding cloth, the means of actuating the lower mask being independent of those of the upper mask.

Preferably, the device according to the present invention comprises left and right masks whose control means are connected, so that the movements of the cloths of said left and right masks are symmetrically opposed relative to the vertical midline of the screen.

According to a first possible embodiment of the invention, the connection of the means of controlling the left and right masks consists of a direct mechanical connection between their rolling shafts, so that the rotary movements of said shafts are simultaneous, in opposite directions from one another.

According to a second possible embodiment of the invention, the connection of the means of controlling the left and right masks consists of an electric connection between the means of rotating their respective rolling shafts, so that the rotary movements of said shafts are simultaneous, in opposite directions from one another.

Advantageously, the device according to the invention comprises left and right masks whose tensioners are each held vertically by holding means.

In the latter case, the means of holding the tensioners of the left and right masks preferably consist of at least one slider placed horizontally above and/or below the screen in which at least one lug—or guide—of the tensioner are slidingly inserted.

In all cases, the width of the cloth of each mask is preferably equal to or greater than the width or the height of the screen.

In addition, the free edge of the cloth of each mask fitted with a tensioner preferably covers the tensioner holding this mask, at least on the front face of the latter.

Also preferably, the cloth of each mask is rolled around the corresponding rolling shaft, via the rear or via the front of the latter, so that the cloth of each mask is vertical and therefore situated in a plane parallel to the general plane of the screen.

Preferably, the first end of each rope is attached to the protruding portion of the tensioner, while the other end is attached directly to the drum of the corresponding motorized shaft.

The means of rotating the rolling shafts each consist, according to a preferred embodiment of the invention, of a motor placed inside each of said rolling shafts and connected to a fixed point situated outside said shaft.

In the latter case, each motor is preferably controlled at a distance by remote control.

Finally, each cloth preferably consists of a matt black fabric which absorbs the light rays projected onto the screen at the edge of the picture.

BRIEF DESCRIPTION OF THE DRAWINGS

To understand it fully, the invention will now be described in detail, with reference to the appended schematic drawing, representing, as a nonlimiting example, a particular embodiment of a masking device according to the invention.

FIG. 4 is a schematic front view of a left and right masking device according to the invention, one of the masks being unrolled, the other being completely rolled up;

FIG. 5 is a front view of a cinema screen fitted with a device with top, bottom, left and right masks according to the invention;

FIG. 6 is an enlarged schematic view in perspective from the front of the upper right portion of a device according to the invention, the protective casing being illustrated transparently;

FIG. 7 is a top view in section along VII/VII of FIG. 6;

FIG. 9 is a view similar to FIG. 6, illustrating a variant embodiment of the invention.

DESCRIPTION OF THE PREFERRED EMBODIMENTS

Figure 1:
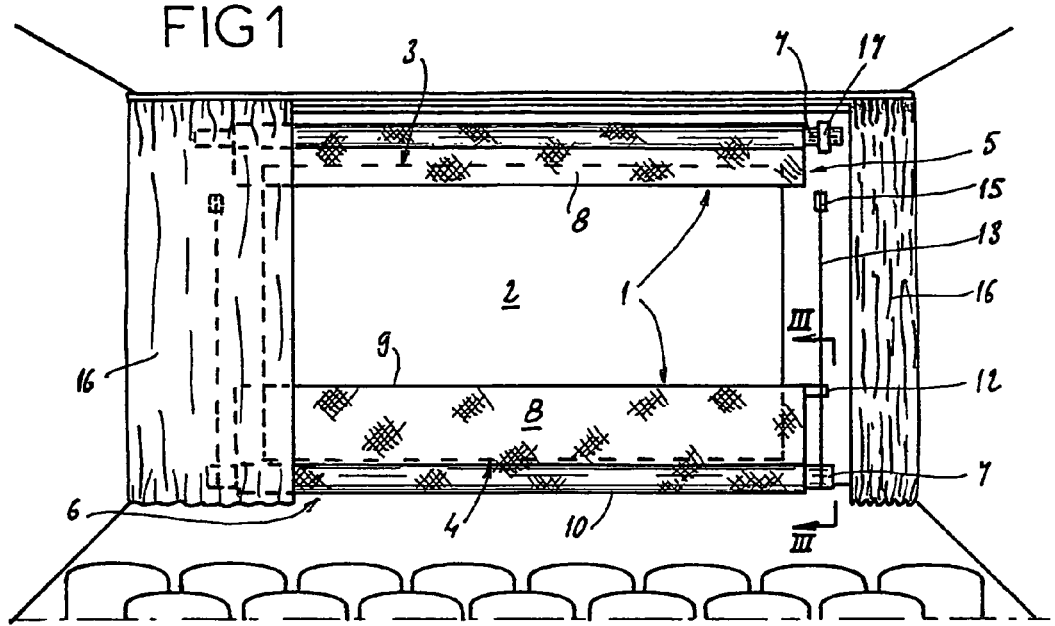
FIG. 1 is a view in perspective of a masking device installed in a cinema auditorium.
Figure 2:
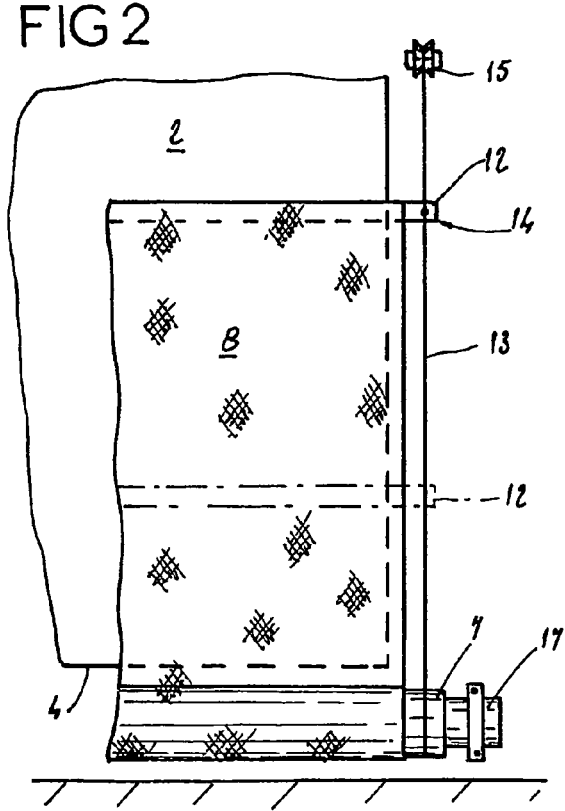
FIG. 2 is a partial schematic front view of the lower mask of a device according to the invention.
Figure 3:
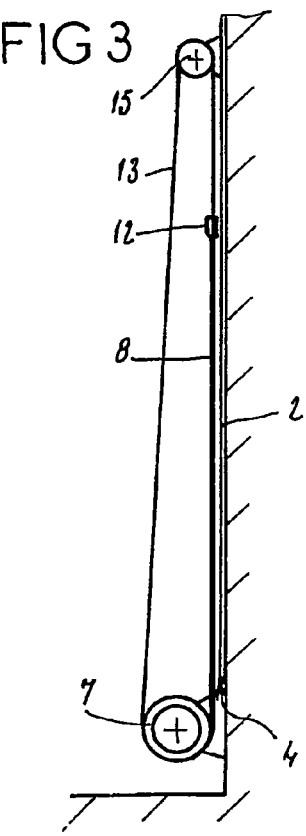
FIG. 3 is a schematic view in profile along III/III of FIG. 1, showing the lower mask of a device according to the invention.

According to a first embodiment of the invention, the masking device for a cinema screen may consist of only one pair of masks, top and bottom, as shown in FIGS. 1 to 3.

The device 1 is then intended to be installed, as illustrated in FIG. 1, around a cinema screen 2, in order to mask, at least partially, the upper edge 3 and lower edge 4 of the latter.

The device of the invention then comprises an upper mask 5 and a lower mask 6, placed in front of the screen 2 as shown in FIG. 3.

Each mask 5, 6 comprises a rolling shaft 7 and a cloth 8 rolled up around said shaft. The rolling shaft of the upper mask 5 is placed horizontally above the screen 2, and the rolling shaft of the lower mask 6 is placed horizontally below the screen 2, as shown in FIG. 1.

For each mask, the corresponding cloth 8 may be unrolled vertically to adapt the height of the mask. "Vertically" here means that the cloth is unrolled in a vertical plane. Specifically, as illustrated in FIG. 3, the cloth, in particular that of the lower mask, is rolled up via the rear of the rolling shaft, which makes it possible always to position it in a plane parallel to the general plane of the screen.

The upper mask 5 comprises actuation means for rotating its rolling shaft 7 and therefore adjusting the corresponding cloth height.

In addition, the rolling shafts of the masks 5, 6 protrude either side of the cloth, as illustrated in FIGS. 1 and 2.

The cloth 8 of each mask consists of a matt black fabric and comprises a free edge 9 and a rolled edge 10.

According to the invention, the lower mask 6 comprises:

(i) a horizontal tensioner 12 to hold the free edge 9 of the cloth 8, the length of the tensioner being greater than the width of the cloth as shown for example in FIG. 2, and (ii) means of controlling the positioning in a vertical plane of the tensioner 12, independent of the means of actuating the rolling shaft of the upper mask 5.

"Tensioner" means any section iron, metal rod or other element that is used to form a brace for the free edge of the cloth.

In addition, one and the same tensioner holds the free edge of the cloth of the upper mask, forming a ballast to prevent said cloth from floating.

The means of controlling the vertical positioning of the tensioner 12 consist, on the one hand, of ropes 13 each attached to one end 14 of the tensioner 12 protruding from the cloth 8 and each vertically connecting said ends 14 to the rolling shaft 7 via angle transmission pulleys 15 placed above the rolling shaft of the cloth, and, on the other hand, of means of rotating the rolling shaft of the lower mask 6, independent of the actuation means of the rolling shaft of the upper mask 5.

As illustrated in FIG. 1, the width of the cloth 8 of each mask is greater than or equal to the width of the screen 2 and the free edge of the cloth of the lower mask covers the holding tensioner, at least on the front face of the latter.

In addition, the cloth 8 of each mask is rolled around the corresponding rolling shaft via the rear of the latter, as illustrated in FIG. 3.

In addition, when the device has been installed, only the cloth portions of the upper mask 5 and lower mask 6 are visible, because the means of controlling the positioning of the masks, in particular the means of controlling the positioning of the lower mask (rope 13, protruding ends 14 of the tensioner and protruding ends of the rolling shaft, and pulleys 15) which are situated essentially either side of the screen 2, may be easily hidden behind a boxwork forming a frame which follows the contours of the screen (not illustrated in the drawing). Curtains 16 may then complete the finish of the assembly, as illustrated in FIG. 1.

The means of rotating each rolling shaft consist of a motor (not illustrated) placed inside each of said rolling shafts 7, which is connected to a fixed point 17 situated outside said shaft 7, as illustrated in FIG. 2.

In addition, each motor is controlled at a distance by remote control.

According to a second embodiment of the present invention, the device consists only of left 18 and right 19 masks, as illustrated in FIG. 4.

In this case, each left mask 18 and right mask 19 is very similar to the bottom—or lower—mask 6 described hereinabove, and comprises:

(i) a tensioner 12 for holding the free edge 9 of the cloth 8 of each mask (18, 19), the length of the tensioner being greater than the length of the cloth, and (ii) means of controlling the positioning of the tensioner in a plane substantially parallel to the plane of the screen and in a direction perpendicular to the unrolling direction of the cloth.

Said control means consist, on the one hand, of ropes 13 each attached to one end 14 of the tensioner protruding from the cloth and each connecting, in a direction substantially parallel to the unrolling direction of the cloth, said ends 14 to the rolling shaft 7 by means of angle transmission pulleys 15 each placed facing a corresponding protruding end 14 and at a distance from the rolling shaft 7, and consisting, on the other hand, of means of rotating the rolling shaft 7, so that each cloth 8 can be unrolled from its shaft toward the center of the screen 2 to adapt the masking area of the corresponding mask.

Figure 8:
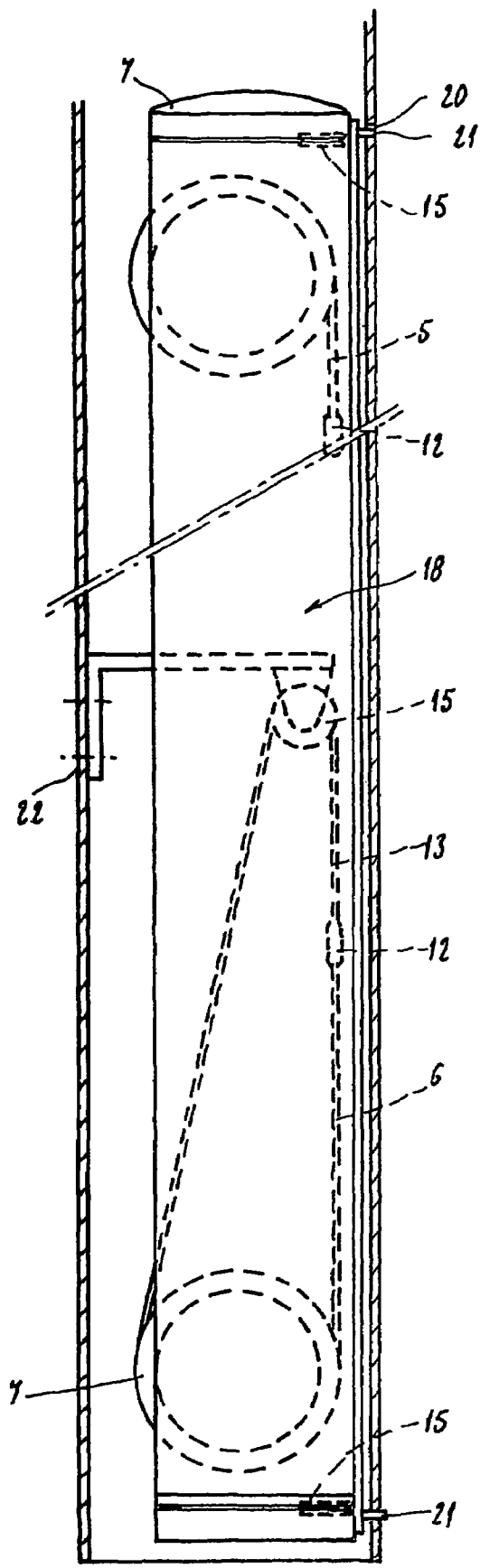
FIG. 8 is a side view in section along VIII/VIII of FIG. 5.

In the embodiment of the invention illustrated in FIGS. 7 and 8, the means of controlling both the left mask 18 and right mask 19 are connected so that the movements of the corresponding cloths are symmetrically opposed relative to the vertical midline of the screen.

Also in this case, the connection of the means of controlling the left and right masks consists of an electric connection between the means of rotating their respective rolling shafts, so that the rotation movements of said shafts are simultaneous, in the opposite direction from one another. Each mask therefore has control means with angle transmission pulleys, and a motor (not illustrated in the drawing) forming a means of rotating its rolling shaft. The motor of each of the left and right masks is hidden inside the corresponding rolling shaft.

Nevertheless, according to an alternative embodiment of the invention not illustrated in the drawing, provision can also be made for the connection of the means of controlling the left and right masks to consist of a direct mechanical connection between their rolling shafts so that the rotating movements of said shafts are simultaneous, in the opposite direction to one another. In this case, only one of the rolling shafts, of the left or of the right mask, comprises a motor forming a means of actuation, and both left and right rolling shafts are connected for example by a rope—or else a cord or a chain—that is crossed between the two shafts so that the rotating movements of said shafts are simultaneous, in the opposite direction from one another.

As illustrated in FIGS. 6, 7 and 8 (not illustrated in FIG. 4), the cloths 8 of the left mask 18 and right mask 19, and the corresponding tensioners 12 must be held horizontally, to prevent them deforming under the effect of their own weight. For this, the cloth 8 is tensioned between its tensioner 12 and its rolling shaft 7, and the tensioner is attached slidingly horizontal thanks to holding means. These holding means may take any appropriate form and in particular, as illustrated in FIG. 6, the form of a horizontal slider 20 placed on the top part of the device, slightly above the upper edge 3 of the screen 2, a slider in which is attached slidingly horizontal, a lug 21 of the tensioner 12, said lug preferably being placed at the terminal part of said tensioner as illustrated in FIG. 6.

The same system of slider 20 forming means of holding the tensioner 12 may also be placed symmetrically relative to the screen, in the bottom part of the device, in which case, a lug 21 placed at the bottom end of each left and right tensioner is attached slidingly horizontal in said bottom slider 20.

Alternatively, an embodiment, not illustrated in the drawing, of the means of holding the tensioners of the left and right masks, consists of U-sections, in which the distal ends of the tensioners are disposed slidingly. The technical effect obtained is then identical to the embodiment of the holding means described hereinabove: the tensioner of each mask, left and right, is held vertically and may slide horizontally when the cloth of the mask is unrolled or rolled up, so that each tensioner is always perfectly vertical, particularly during its movement, and always moves perfectly horizontally.

Finally, according to a third embodiment of the present invention, illustrated in FIGS. 5 to 8, the device 1 comprises two pairs of masks: a pair of masks, upper 5 and lower 6 and a pair of masks, left 18 and right 19.

In all the variant embodiments described hereinabove as examples, as illustrated in the drawing, the device—in particular the rolling shafts 7, the ropes 13, and the angle transmission pulleys 15 are hidden behind a protective casing 22. This casing plays a role that is essentially esthetic and protective against dust in the case of a device comprising only upper and lower, or left and right masks.

Nevertheless, in the case in which the device of the invention comprises a combination of pairs of right and left, and top and bottom, masks, this casing 22 is also used to attach certain angle transmission pulleys 15.

Specifically, in the case in which the device comprises four masks placed face to face in pairs around the screen, the side masks (18, 19) are placed so as to frame the top mask 5 and bottom mask 6. In this case, the pulleys 15 of the bottom mask, if they were placed as described hereinabove in the case of the second embodiment of the invention, would constitute an obstacle to the deployment of the cloths of the left and right masks. For this reason, and as illustrated in FIGS. 7 and 8, the two angle transmission pulleys of the bottom mask, situated at the left and right ends of the tensioner, are attached to the inner surface of the front part of the casing 22. Thus, the left mask 18 and right mask 19 are not hampered when they are unrolled between the screen 2 and the top mask 5 and bottom mask 6.

Similarly, the shafts for rolling the top and bottom masks are attached to the casing 22 and not to the wall, as illustrated in FIG. 6, for the reasons explained hereinabove.

In the latter case in which the device comprises four masks, the movements of the masks may be simultaneous, but it may also be possible to dissociate the movements of the top and bottom masks on the one hand, and those of the right and left side masks on the other hand.

As illustrated in FIG. 6, each of the ropes 13 that connects the tensioner 12 to the motorized shaft 7 may be placed in a loop, that is to say that the two ends of this rope are attached to the tensioner 12, the loop formed by said rope being tensioned between the sheave of the pulley 15 and the groove of the corresponding motorized shaft 7.

Alternatively, as shown in FIG. 9, each rope 13 may be placed so that a first of its ends is attached to the protruding part 14 of the tensioner 12, while the other end is attached directly to the drum of the corresponding motorized shaft 7. Care must be taken in such a configuration to wind the rope around the motorized shaft by several successive turns, in order to improve the grip of said rope on the shaft 7.

It goes without saying that the invention is not limited to the embodiment described hereinabove as an example but that, on the contrary, it embraces all the variants thereof. Thus, the rotation of the shafts for rolling the masks could be achieved manually, or be motorized as described hereinabove with control subject to the detection of a particular video source. In the latter case, the motors are stepper motors, connected to the video source via an electronic module in order to allow the video image format projected onto the screen to be detected and the height of the upper and lower masks to be adjusted correctly.

The invention claimed is:

1. A masking device for a cinema screen comprising:
at least two masks disposed in front of said screen, and placed in pairs symmetrically along at least two sides, left and right and/or top and bottom, of the screen, each mask comprising a rolling shaft and a cloth rolled up around said shaft, each rolling shaft protruding either side of the cloth and each cloth comprising a rolled edge and a free edge, wherein at least the lower mask and/or the pair of left and right masks comprise(s):
a tensioner for holding the free edge of the cloth of each mask, a length of the tensioner being greater than a length of the cloth, and
means of controlling a positioning of the tensioner in a plane substantially parallel to a plane of the screen and in a direction perpendicular to an unrolling direction of the cloth, said means comprising, on the one hand, ropes each attached to one end of the tensioner protruding from the cloth and each connecting, in a direction substantially parallel to the unrolling direction of the cloth, said ends to the rolling shaft of the mask to which said tensioner is attached by means of angle transmission pulleys each placed facing a corresponding protruding end and at a distance from the rolling shaft, and, on the other hand, means of rotating the rolling shaft, so that each cloth can be unrolled from its shaft toward a center of the screen to adapt the masking area of said mask.

2. The device as claimed in claim 1, wherein it comprises a pair of masks, upper and lower, the upper mask comprising actuation means allowing rotation of the rolling shaft and therefore adjustment of the masking area of the corresponding cloth, the means of actuating the lower mask being independent of those of the upper mask.

3. The device as claimed in claim 1, wherein it comprises left and right masks whose control means are connected, so that the movements of the cloths of said left and right masks are symmetrically opposed relative to a vertical midline of the screen.

4. The device as claimed in claim 3, wherein the connection of the means of controlling the left and right masks comprises a direct mechanical connection between the rolling shafts, so that rotary movements of said shafts are simultaneous, in opposite directions from one another.

5. The device as claimed in claim 3, wherein the connection of the means of controlling the left and right masks comprises an electric connection between the means of rotating the respective rolling shafts, so that rotary movements of said shafts are simultaneous, in opposite directions from one another.

6. The device as claimed in claim 1, wherein it comprises left and right masks whose tensioners are each held vertically by holding means.

7. The device as claimed in claim 6, wherein the means of holding the tensioners of the left and right masks comprises at least one slider placed horizontally above and/or below the screen in which at least one lug of the tensioner is slidingly inserted.

8. The device as claimed in claim 1, wherein a width of the cloth of each mask is equal to or greater than a width or the height of the screen.

9. The device as claimed in claim 1, wherein the free edge of the cloth of each mask fitted with a tensioner covers the tensioner holding this mask, at least on a front face of the latter.

10. The device as claimed in claim 1, wherein the cloth of each mask is rolled around the corresponding rolling shaft, via a rear or via a front of the latter, so that the cloth of each mask is vertical and therefore situated in a plane parallel to a general plane of the screen.

11. The device as claimed in claim 1, wherein a first end of each rope is attached to the protruding portion of the tensioner, while an other end is attached directly to a drum of the corresponding shaft.

12. The device as claimed in claim 1, wherein the means of rotating the rolling shafts each consist of a motor placed inside each of said rolling shafts and connected to a fixed point situated outside said shaft.

13. The device as claimed in claim 12, wherein each motor is controlled at a distance by remote control.

14. The device as claimed in claim 1, wherein each cloth comprises a matt black fabric.

* * * * *